(12) United States Patent
Yang et al.

(10) Patent No.: US 6,768,657 B1
(45) Date of Patent: Jul. 27, 2004

(54) CURRENT-DRIVEN PWM CONTROLLER HAVING A POWER SAVING MEANS

(75) Inventors: Ta-yung Yang, Milpitas, CA (US); Chern-Lin Chen, Taipei (TW); Jenn-yu G. Lin, Taipei (TW)

(73) Assignee: System General Corp., Taipei Hsien (TW)

( * ) Notice: Subject to any disclaimer, the term of this patent is extended or adjusted under 35 U.S.C. 154(b) by 0 days.

(21) Appl. No.: 10/249,141

(22) Filed: Mar. 19, 2003

(51) Int. Cl.[7] .......................... H02M 1/14; H02M 3/335
(52) U.S. Cl. ...................... 363/41; 363/21.18
(58) Field of Search ............................ 363/21.01, 21.1, 363/21.11, 21.18, 26, 41, 97; 323/283, 284, 351

(56) References Cited

U.S. PATENT DOCUMENTS

| | | | |
|---|---|---|---|
| 5,939,871 A | * 8/1999 | Tanaka | 323/285 |
| 6,100,675 A | 8/2000 | Sudo | 323/282 |
| 6,366,070 B1 | 4/2002 | Cooke et al. | 323/284 |
| 6,420,858 B1 | * 7/2002 | Kitagawa et al. | 323/282 |
| 6,597,159 B2 | * 7/2003 | Yang | 323/283 |
| 6,661,679 B1 | * 12/2003 | Yang et al. | 363/41 |

* cited by examiner

Primary Examiner—Adolf Berhane
(74) Attorney, Agent, or Firm—Jianq Chyun IP Office

(57) ABSTRACT

Incorporating the PWM function with the power saving means develops the PWM controller in which the switching frequency is decreased in response to the decrease of the load. Further, the current-driven design minimizes the circuitry and reduces the cost of the PWM controller. Since most of the control signals are operated in current mode, the die size of integrated circuit of the PWM controller is greatly reduced. An off-time modulator is provided for power saving in which the discharge current of the oscillator is modulated. Keeping the maximum on-time of the PWM signal as a constant and increasing the off-time of the PWM signal extends the switching period in light load conditions. The off-time modulation is the function of a feedback current, which is derived from the feedback loop. An array of current operation is designed to generate the feedback voltage for the PWM control and meanwhile produces a modulated discharge current for power saving. A minimum discharge current is limited to prevent the switching frequency from flowing into the audio-band. Moreover, the minimum discharge current is switched on/off in response to the state of the supply voltage in which the minimum discharge current is disabled when the supply voltage is high, and enabled once the supply voltage is lower than a threshold voltage; thereby preventing insufficient power from being supplied from the auxiliary bias winding for the PWM controller.

3 Claims, 5 Drawing Sheets

CURRENT-DRIVEN PWM CONTROLLER HAVING A POWER SAVING MEANS

BACKGROUND OF THE INVENTION

1. Field of the Invention

The present invention relates to a switching mode power supply and more specifically relates to the pulse width modulation (PWM) of the switching mode power supply.

2. Background of the Invention

The PWM is a traditional technology used in switching power supplies for regulating outputs. Due to the restriction of environmental regulations, the power supply design for computers and other electrical products are required in order to equip the power management function to save energy. One of the major concerns of the power management is to save power in light load and no load conditions.

FIG. 1 shows a general switching power supply, in which a PWM controller 100 is used to control and regulate the output of the power supply. When the line voltage $V_{IN}$ is applied to the power supply, a capacitor 220 connected to a supply voltage pin VCC of the PWM controller 100 will be charged via a resistor 210. Once the supply voltage $V_{CC}$ in the VCC pin of the PWM controller reaches a start-threshold voltage, the PWM controller 100 will be turned-on and start to operate. After that, the auxiliary bias winding of the transformer 400 will supply the power for the PWM controller 100 through a rectifier 230. If the supply voltage $V_{CC}$ is lower than a stop-threshold voltage due to insufficient power from the auxiliary bias winding, the PWM controller 100 could be turned-off. A resistor 240 connected in series with a switching transistor 300 is used to convert the switching current of the transformer 400 into a sense voltage $V_S$, which is compared with a feedback signal $V_{FB}$ to achieve the current mode PWM control. The feedback voltage $V_{FB}$ is derived from the output of an optical-coupler 250. The input of the optical coupler 250 is connected to the output of the power supply $V_O$ through a resistor 290 and a zener diode 280 to form the feedback loop. The feedback voltage $V_{FB}$ controls the on-time ($T_{ON}$) of the PWM signal and regulates the output of the power supply.

The power consumption is a major concern for switching mode power supplies. Various losses such as the transformer core loss, the transistor and the rectifier switching losses, and the snubber loss, are directly proportional to the switching frequency F. The switching period T is the reciprocal of the switching frequency F. Increasing the switching period will reduce the power loss, however a maximum on-time ($T_{ON(max)}$) of the switching signal is required to be restricted to prevent saturating magnetic components such as inductors and transformers.

In order to increase the regulator efficiency, some methods such as varying the switching frequency and entering the "pulse-skipping" mode according to load conditions have been disclosed. For example, U.S. Pat. No. 6,100,675, "SWITCHING REGULATOR CAPABLE OF INCREASING REGULATOR EFFICIENCY UNDER LIGHT LOAD" disclosed an oscillation frequency control circuit capable of varying an oscillation frequency of the oscillator circuit in response to load conditions. Another method is disclosed in U.S. Pat. No. 6,366,070 B1, "SWITCHING VOLTAGE REGULATOR WITH DUAL MODULATION CONTROL SCHEME", which disclosed the regulator employs three operation modes which operate at constant switching frequency for heavy load conditions, use dual modulation control scheme for moderate load conditions and enter "pulse-skipping" for light load conditions. The disadvantage of foregoing prior arts are: (1) Varying the switching frequency without the limitation of maximum on-time may result in saturation of magnetic components and cause over-stress damage to switching devices such as transistors and rectifiers. (2) The modulation of switching frequency is only controlled by load conditions and is not correlated with the supply voltage. As the switching frequency is reduced too low for saving more power in light load and no load conditions, the auxiliary bias winding of the transformer or inductor might be unable to provide sufficient power for the PWM controller. Thus, to correlate the frequency modulation with both load conditions and the supply voltage is absolutely needed. (3) In light load and no load conditions, the switching frequency might decrease and fall into the audio band. If the magnetic components are not well impregnated, the audio band switching frequency might generate acoustic noises.

To prevent above shortcomings of prior arts, there exists a need for a better apparatus with less acoustic noises to Improve the efficiency and save the power consumption in light load and no load conditions.

SUMMARY OF THE INVENTION

According to the present Invention, a current-driven PWM controller is implemented by incorporating the PWM function with the power saving means in which the switching frequency is decreased In response to the decrease of the load. Furthermore, a current-driven technique is mainly used to minimize the circuitry and reduce the cost of the PWM controller. Operating most of the control signals in current mode greatly reduces the die size of the Integrated PWM controller circuit. An off-time modulator is provided for power saving which results in keeping constant the maximum on-time of the PWM signal and increasing the off-time of the PWM signal. Thus, the switching period in light load conditions is extended. The off-time modulation is designed as the function of a feedback current that is derived from the feedback loop and represents the load condition.

Accordingly, the off-time modulator comprises: a reference voltage associated with a first resistor which generates a first constant current and a second constant current. The first constant current subtracts a current mirrored from the feedback current and generates a first differential current. A first output current mirrored from the first differential current produces a feedback voltage through a second resistor. The feedback voltage is further used for the PWM control and generates the PWM signal. The second constant current subtracts another current mirrored from the feedback current and generates a second differential current for the purpose of the off-time modulation. A second output current mirrored from the second differential current is clamped below a maximum value that controls a minimum off-time for high load conditions. A minimum discharge current is further mirrored from the reference current. The minimum discharge current determines a maximum off-time for the switching signal. Additionally, the minimum value of the minimum discharge current is limited to prevent the switching frequency from falling into the audio band.

The input of a control circuit is connected to the supply voltage. The output of the control circuit is used to turn on/off the minimum discharge current in response to the state of the supply voltage. The minimum discharge current is disabled when the supply voltage is high. The minimum discharge current and the switching of the PWM signal are enabled once the supply voltage is lower than the threshold voltage. Therefore, an Insufficient power supplied from the auxiliary bias winding is avoided for the PWM controller.

Advantageously, the current-driven off-time modulation improves the efficiency and saves the power consumption of the power supply in light load and no load conditions. Meanwhile, the acoustic noise is reduced. The magnetic devices are prevented from saturation. Furthermore, due to the current-driven design, the complexity and cost of the controller circuit are both reduced.

It is to be understood that both the foregoing general description and the following detail description are exemplary and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
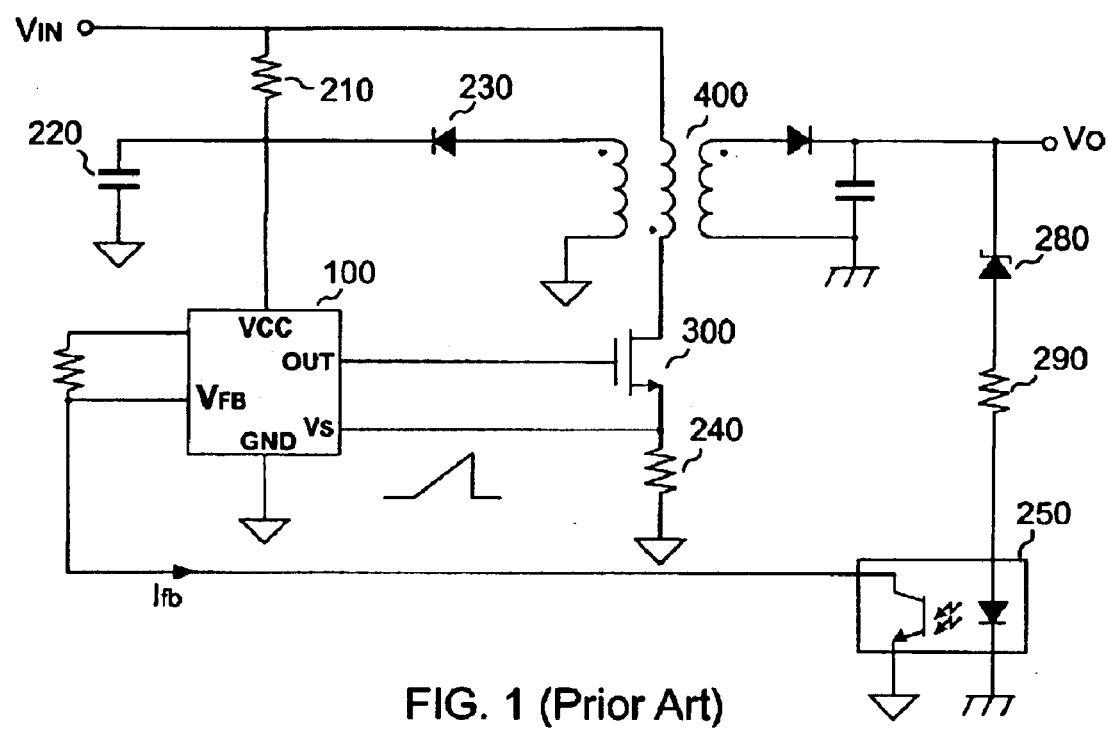
FIG. 1 shows a traditional flyback circuit of the switching mode power supply.
Figure 2:
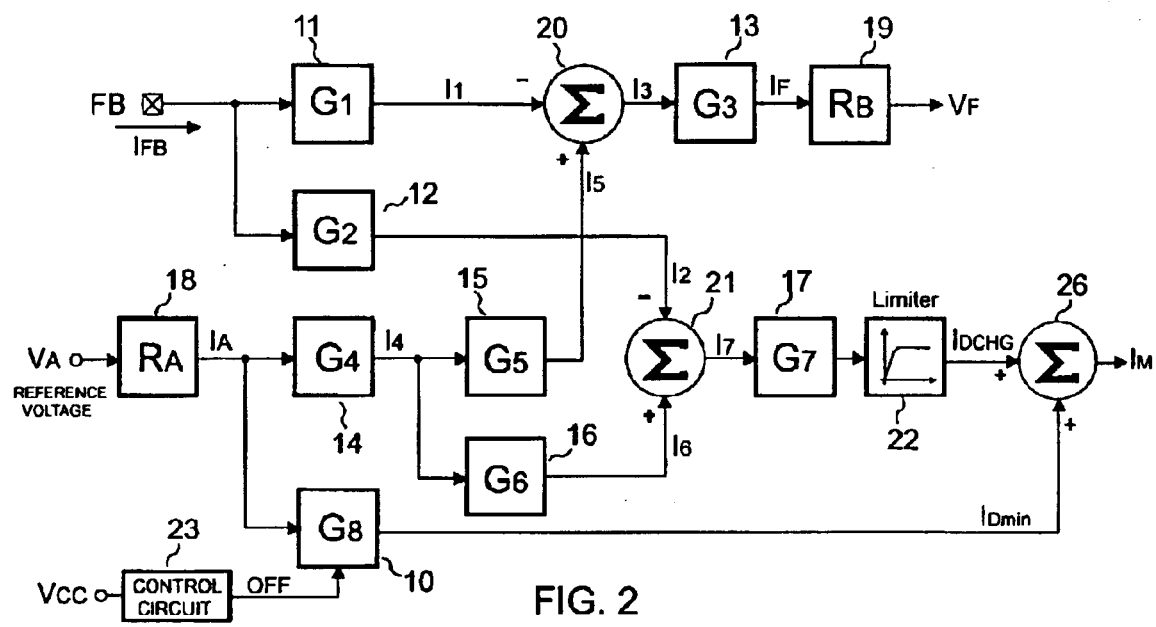
FIG. 2 Illustrates the block diagram of the current-driven operation of the off-time modulator according to a preferred embodiment of the present invention.
Figure 3:
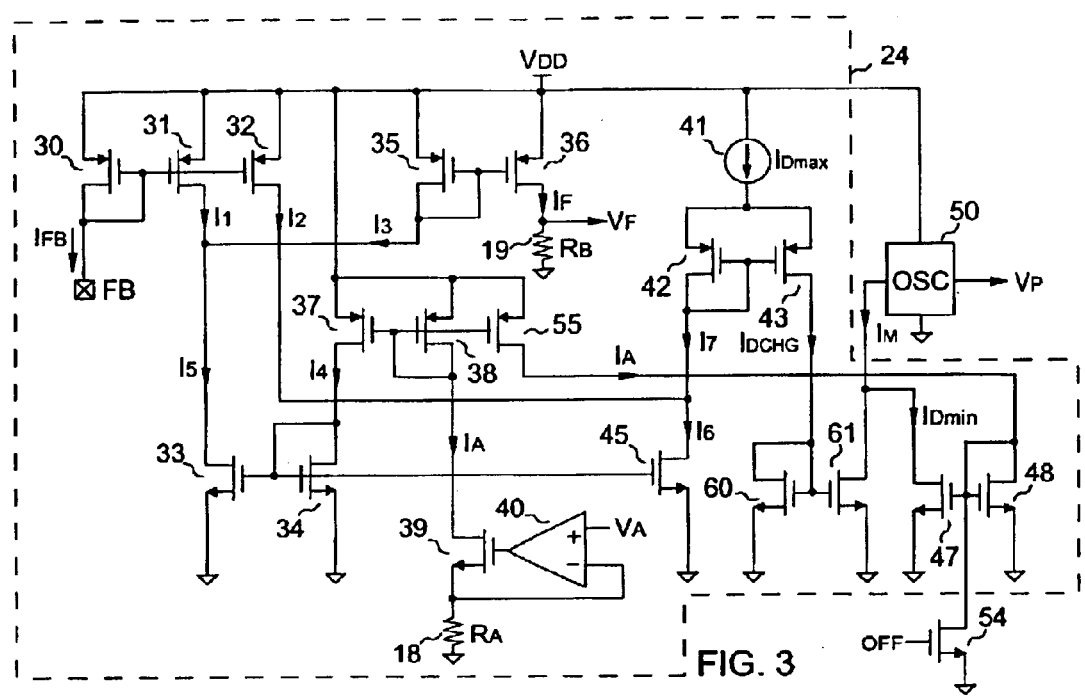
FIG. 3 shows the preferred embodiment of the off-time modulator of the current-driven PWM controller according to the present invention.

FIG. 2 shows the block diagram of the operation of the off-time modulator according to a preferred embodiment of the present invention. A feedback current $I_{FB}$ is connected to inputs of a current mirror 11 ($G_1$) and a current mirror 12 ($G_2$) Through a resistor 18 ($R_A$), a reference voltage $V_A$ is converted into a reference current $I_A$ which is applied to an input of a current mirror 14 ($G_4$). An output of a current mirror 14 ($G_4$) is connected to inputs of a current mirror 15 ($G_5$) and a current mirror 16 ($G_6$) to generate a constant current $I_5$ and a constant current $I_6$ respectively. An output of the current mirror 11 is connected to a negative input of an adder 20. An output of the current mirror 15 is connected to a positive input of the adder 20. An output of the adder 20 is connected to an input of a current mirror 13 ($G_3$). The current mirror 13 outputs a current $I_F$. A resistor 19 ($R_B$) converts the current $I_F$ into a feedback voltage $V_F$. An output of the current mirror 12 is connected to a negative input of an adder 21. An output of the current mirror 16 is connected to a positive input of the adder 21. An output of the adder 21 is connected to an input of a current mirror 17 ($G_7$). A limiter 22 clamps the output of the current mirror 17 and outputs an initial-discharge current $I_{DCHG}$. The initial-discharge current $I_{DCHG}$ is clamped below a maximum discharge current $I_{Dmax}$ by a current source 41, which is shown in FIG. 3 and described later. A current mirror 10 ($G_8$) copies a minimum discharge current $I_{Dmin}$ from the reference current $I_A$. An adder 26 sums the initial-discharge current $I_{DCHG}$ with the minimum discharge current $I_{Dmin}$ to generate a discharge current $I_M$. The supply voltage $V_{CC}$ is connected to an input of a control circuit 23. Foregoing off-time modulator generates the feedback voltage $V_F$ and meanwhile produces the discharge current $I_M$ which reduces the complexity of the circuit.

However, the feedback current $I_{FB}$, the resistor $R_A$ and the resistor $R_B$ are variables for both of the feedback voltage $V_F$ and the discharge current $I_M$, which are given by:

$$V_F = G_5 \times G_4 \times G_3 \times (R_B/R_A) \times V_A - G_3 \times G_1 \times R_B \times I_{FB} \qquad (1)$$

$$I_M = G_7 \times G_6 \times G_4 \times (V_A/R_A) - G_7 \times G_2 \times I_{FB} + (V_A/R_A) \times G_8 \qquad (2)$$

, where $I_{Dmin} < I_M < I_{Dmax}$

The variation of the resistor $R_A$ and $R_B$ will cause the variation for both the feedback voltage $V_F$ and the discharge current $I_M$. Through the feedback loop control, the variation of the resistor $R_A$ and $R_B$ further affect the feedback current $I_{FB}$, and then have an effect on the feedback voltage $V_F$ and the discharge current $I_M$. In order to minimize the mismatch of the variation between the feedback voltage $V_F$ and the discharge current $I_M$, the proper parameters of the circuit should be selected.

The equation (1) can be converted into, $$G_3 \times G_1 \times R_B \times I_{FB} = G_5 \times G_4 \times G_3 \times (R_B/R_A) \times V_A - V_F$$

Set $R_B = n \cdot R_A$ $$I_{FB} = (G_5 \times G_4 = G_3 \times nV_A - V_F)/(G_3 \times G_1 \times nR_A)$$

$$\frac{\partial I_{FB}}{\partial R_A} = \frac{-(G_5 \times G_4 \times G_3 \times nV_A - V_F)}{G_3 \times G_1 \times n \times R_A^2} \qquad (3)$$

The equation (2) can be converted into, $$G_1 \times G_2 \times I_{FB} = G_7 \times G_6 \times G_4 \times \frac{V_A}{R_A} - I_M$$

$$I_{FB} = \frac{G_6 \times G_4}{G_2} \times \frac{V_A}{R_A} - \frac{I_M}{G_7 \times G_2}$$

$$\frac{\partial I_{FB}}{\partial R_A} = \frac{-(G_6 \times G_4 \times V_A)}{G_2 \times R_A^2} \qquad (4)$$

$$\frac{(G_5 \times G_4 \times G_3 \times nV_A - V_F)}{G_3 \times G_1 \times n} = \frac{G_6 \times G_4 \times V_A}{G_2} \qquad (5)$$

To satisfy equation (5), the variation of the discharge current $I_M$ will be correlated to the variation of the feedback voltage $v_F$. Therefore, for an integrated circuit design, the influence caused by the variation of the resistor is minimized.

FIG. 3 shows the preferred embodiment of the off-time modulator of the current-driven PWM controller according to the present invention which includes a first current mirror ($G_1$) composed of a transistor 30 and a transistor 31, a second current mirror ($G_2$) composed of the transistor 30 and a transistor 32, a third current mirror ($G_3$) composed of a transistor 35 and a transistor 36 a fourth current mirror ($G_4$) composed of a transistor 37 and a transistor 38 6 a fifth current mirror ($G_5$ composed of a transistor 33 and a transistor 34, a sixth current mirror ($G_6$) composed of the transistor 34 and a transistor 45, a current source 41, a seventh current mirror ($G_7$) composed of a transistor 42 and a transistor 43, an eighth current mirror ($G_8$) composed of the transistor 38 and a transistor 55 and an output-adder composed of a transistor 47, a transistor 48, a transistor 60 and a transistor 61. The gates of the transistors 30, 31 and 32 and the drain of the transistor 30 are tied together and connected to the feedback current $I_{FB}$ The sources of the transistor 30, 31,32, 35, 36, 37, 38 and 55 are connected to a source voltage $V_{DD}$. The gates of the transistor 35 and the transistor 36 and the drain of the transistor 35 are tied together and connected to the drain of the transistor 31. A resistor 19 ($R_B$) is connected between the drain of the transistor 36 and the ground. The resistor 19converts the drain current of the transistor 36 and produces the feedback voltage $V_F$. The drain of the transistor 33 is connected to the drain of the transistor 31. The gates of the transistor 33, 34 and 45 and the drain of the transistor 34 are tied together and connected to the drain of the transistor 37. The sources of the transistor 33, 34 are connected to the ground. The gates of the transistor 37, 38 and 55 and the drain of the transistor 38 are connected together and connected to the drain of a transistor 39. The reference voltage $V_A$ is connected to the positive input of an op amplifier 40. The output of the op amplifier 40 is connected to the gate of the transistor 39. The negative input of the op amplifier 40 is connected to the source of the transistor 39. A resistor 18 ($R_A$) is connected between the source of the transistor 39 and the ground. The current source 41 is connected between the source voltage $V_{DD}$ and the sources of the transistor 42 and the transistor 43. The gates of the transistor 42 and 43 and the drain of the transistor 32 and 42 are tied together and connected to the drain of the transistor 45. The source of the transistor 45 is connected to the ground. The gates of the transistor 60 and 61 and the drain of the transistor 60 are connected together and connected to the drain of the transistor 43. The sources of the transistor 60 and 61 are connected to the ground. The drain of the transistor 61 and the drain of the transistor 47 are tied together and connected to the input of the oscillator 50. The gates of the transistor 47 and 48 and the drains of the transistor 48 and 54 are tied together and connected to the drain of the transistor 55. The sources of the transistor 47, 48 and 54 are connected to the ground. The drain of the transistor 54 connected to the drain and the gate of the transistor 48 is used to switch on/off the minimum discharge current $I_{Dmin}$ for the oscillator 50.

Figure 4:
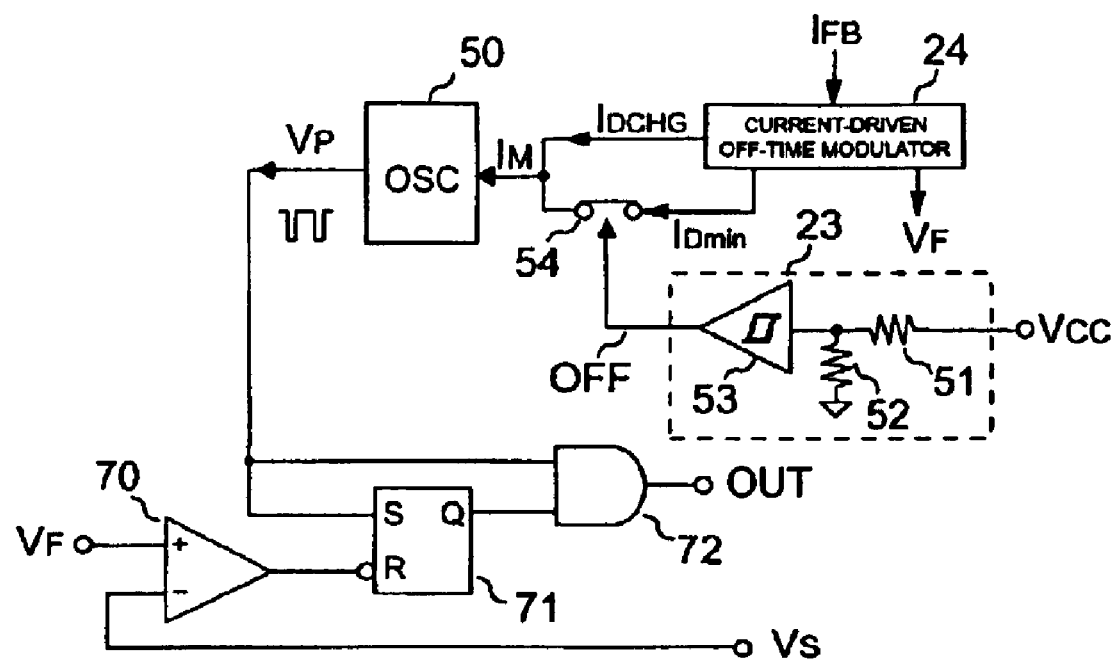
FIG. 4 shows the schematic circuit of the PWM controller according to the present invention.
Figure 5:
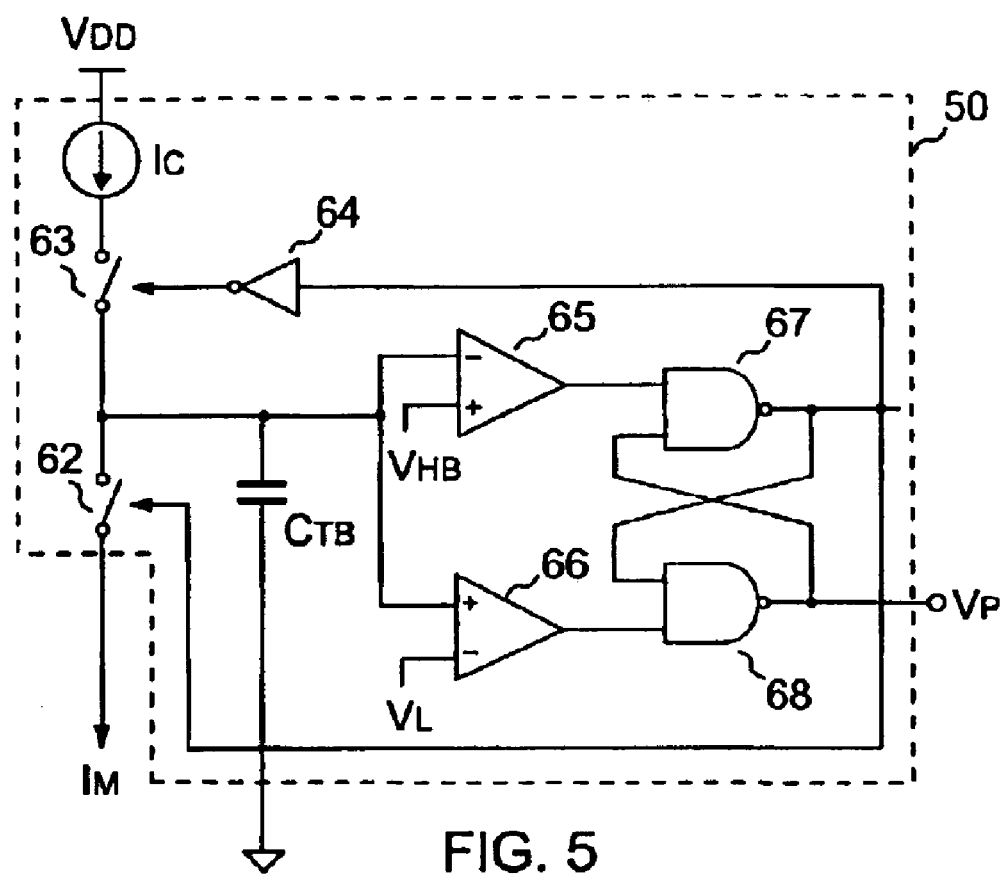
FIG. 5 shows the preferred embodiment of the oscillator according to the present invention.

The pulse signal $V_P$ shown in FIG. 4 and FIG. 5 is used to generate the PWM signal. Referring to FIG. 4, the pulse signal $V_P$ is connected to a set-input of a RS register 71 and an input of an AND gate 72 for generating the PWM signal at an output of the AND gate 72. An output of the RS register 71 is connected to another input of the AND gate 72. A reset-input of the RS register 71 is connected to an output of a comparator 70 for controlling the on-time of the PWM signal. A positive input of the comparator 70 is coupled to the feedback voltage $V_F$. A negative input of the comparator 70 is connected to the sense voltage $V_S$ that is converted from the switching current.

A control circuit 23shown in FIG. 4 includes a resistor 51, a resistor 52 and a hysteresis-buffer 53.The resistor 51 is connected between the supply voltage $V_{CC}$ and an Input of the hysteresis-buffer 53. The resistor 52 is connected between the input of the hysteresis-buffer 53 and the ground. The resistor 52 associated with the resistor 51 develops a divider for attenuating the supply voltage $V_{CC}$. An output of the hysteresis-buffer 53 is connected to the gate of the transistor 54shown in FIG. 3, for switching on/off the minimum discharge current $I_{Dmin}$ in accordance with the state of the supply voltage. The hysteresis-buffer 53 has a first threshold voltage such as 2.5V and a second threshold voltage such as 1.5V. The second threshold voltage defines a lowstate of the supply voltage. When the attenuated supply voltage output by the divider is higher than the first threshold voltage, the minimum discharge current will be disabled by a logic high OFF-signal. Meanwhile, the switching of the power converter could be halted if the initial-discharge current $I_{DCHG}$ is decreased to zero in light load or no load conditions. Once the supply voltage falls below the second threshold voltage, the hysteresis-buffer 53 will output a logical low OFF-signal to enable the minimum discharge current $I_{Dmin}$ and restart the switching to avoid insufficient power supplied from the auxiliary bias winding.

As FIG. 5 shows, a NAND gate 68 and a NAND gate 67 form a RS latch circuit. The NAND gates 67 and the NAND gate 68 are driven by a comparator 65 and a comparator 66 respectively. A high-threshold voltage $V_{HB}$ is coupled to a positive input of the comparator 65. A low-threshold voltage $V_L$ is coupled to a negative Input of the comparator 66. A negative input of the comparator 65 and a positive input of the comparator 66 are tied together and connected to a capacitor $C_{TB}$. At an initial state, the voltage applied to the capacitor $C_{TB}$ is zero. The comparator 65 outputs a logic high signal to the input of the NAND gate 67. The comparator 66 outputs a logic low signal to the input of the NAND gate 68 and the output of the NAND gate 68outputs a logic high signal. The NAND gate 67 outputs a logic low signal and drives a NOT gate 64 to turn on a switch 63. The charge current source $I_C$ starts to charge the capacitor $C_{TB}$. When the voltage on $C_{TB}$ is greater than $V_{HB}$, the NAND gate 67 outputs a logic high signal to turn off the switch 63 and turn on a switch 62 to discharge the capacitor $C_{TB}$. The capacitor $C_{TB}$ is discharged by the discharge current $I_M$.

By modulating the discharge current $I_M$, the off-time of the $V_P$ signal is then modulated. The on-time of the switching period is controlled through the feedback loop to regulate the power of the power supply. The charge current source $I_C$ determines the maximum on-time of the switching period. Increasing the switching period by only increasing the off-time prevents the magnetic components such as inductors and transformers from being saturated. The maximum on-time ($T_{ON(max)}$) and the off-time ($T_{OFF}$) of the switching period, and the switching frequency (F) of the PWM signal can be expressed as:

$$T_{ON(max)} = [(V_{HB} - V_L) \times C_{TB}]/I_C \tag{5}$$

$$T_{OFF} = [(V_{HB} - V_L) \times C_{TB}]/I_M \tag{6}$$

$$F = \frac{1}{T_{ON} + T_{OFF}} \tag{7}$$

As describe above, the current-driven PWM controller including an off-time modulation according to the present invention progressively reduces the power consumption for the power supply in light load and no load conditions. The cost of the PWM controller is reduced. Furthermore, while the switching frequency is modulated, the acoustic noise is reduced and the magnetic devices are prevented from being saturated.

It will be apparent to those skilled in the art that various modifications and variations can be made to the structure of the present Invention without departing from the scope or spirit of the invention. In view of the foregoing, it is intended that the present invention cover modifications and variations of this invention provided they fall within the scope of the following claims and their equivalents.

What is claimed is:

1. A current-driven PWM controller having a power saving means comprising:

a current-driven off-time modulator having an input terminal and three output terminals, wherein the input terminal is connected to a feedback current derived from a feedback loop, wherein the first output terminal outputs a feedback voltage for the PWM controller, the second and third output terminals output a discharge current and a minimum discharge current respectively for determining an off-time of as witching period;

an oscillator having an input terminal and an output terminal, in which the discharge current is applied to an input terminal of the oscillator and a pulse-signal generated at the output terminal of the oscillator; wherein a maximum on-time of the pulse-signal is kept as a constant and an off-time of the pulse-signal is increased in accordance with the decrease of the discharge current;

a control circuit having an input terminal and an output terminal, wherein the input terminal is connected to the supply voltage, the output terminal outputs an OFF-signal to switch on/off the minimum discharge current; wherein the control circuit outputs a logic low OFF-signal to enable the minimum discharge current and restarts the switching as the supply voltage falls below a low threshold, thereby preventing the PWM controller from being turned off due to an insufficient supply voltage;

a switch, which is controlled by the OFF-signal to switch on/off the minimum discharge current;

a RS register, wherein the set-input is connected to the pulse-signal and the reset-input is controlled by a compared signal;

an AND-gate having two input terminals for outputting a PWM signal, in which the first input terminal of the AND-gate is connected to the pulse-signal and the second input terminal of the AND-gate is connected to the output of the RS register; wherein the PWM signal is off in response to the off state of the pulse signal; and a comparator having a negative input terminal, a positive input terminal and an output terminal wherein the positive input terminal is connected to the feedback voltage, the negative input terminal is connected to the sense voltage derived from the switching current, and the output terminal generates the compared signal to reset the RS register.

2. The current-driven PWM controller as claimed in claim 1, wherein the current-driven off-time modulator comprising:

a first current mirror for mirroring a first current from a feedback current;

a second current mirror for mirroring a second current from the feedback current;

a reference voltage;

an op-amplifier associated with a V-to-I resistor and a reference transistor for converting a reference voltage to a reference current;

a fourth current mirror for mirroring a fourth current from the reference current;

a fifth current mirror for mirroring a fifth current from the fourth current;

a sixth current mirror for mirroring a sixth current from the fourth current;

a first adder, operative to generate a third current by subtracting the first current from the fifth current;

a third current mirror for mirroring a first output current from the third circuit;

an I-to-V resistor associated with the first output current for generating the feedback voltage;

a second adder, operative to generate a seventh current by subtracting the second current from the sixth current;

a seventh current mirror used for generating the discharge current, wherein the discharge current is mirrored from the seventh current;

a limiter, operative to clamp the discharge current under a discharge current maximum;

an eighth current mirror used for generating the minimum discharge current, in which the minimum discharge current is mirrored from the reference current.

3. The PWM controller as claimed in claim 1, wherein the controller circuit comprising:

a first resistor connected to the supply voltage, a second resistor associated with the first resistor to form a divider for attenuating the supply voltage, a hysteresis-buffer having an input terminal connected to the first and second resistor for detecting the supply voltage, and an output terminal which generates the OFF-signal; wherein the hysteresis-buffer having two threshold voltages in which the first threshold voltage provides the threshold for disabling the minimum discharge current and the second threshold voltage defines the lowsupply voltage and indicates an insufficient power for the PWM controller.

* * * * *